United States Patent [19]
Daoud

[11] Patent Number: 5,803,292
[45] Date of Patent: Sep. 8, 1998

[54] UNIFORM BUILDING ENTRANCE PROTECTOR HOUSING CONSTRUCTION WITH EXPANDABLE SPLICE CHAMBER

[75] Inventor: Bassel H. Daoud, Parsippany, N.J.

[73] Assignee: Lucent Technologies Inc., Murray Hill, N.J.

[21] Appl. No.: 716,002

[22] Filed: Sep. 19, 1996

[51] Int. Cl.⁶ .................................................. B65D 6/00
[52] U.S. Cl. ......................................................... 220/4.02
[58] Field of Search ................................... 220/4.02, 3.8, 220/334, 337

[56] References Cited

U.S. PATENT DOCUMENTS

| | | | |
|---|---|---|---|
| 4,274,545 | 6/1981 | Peroni | 220/4.02 |
| 5,147,981 | 9/1992 | Buet et al. | 220/4.02 X |
| 5,402,322 | 3/1995 | Kunkler | 220/4.02 X |
| 5,495,389 | 2/1996 | Dewitt et al. | 220/4.02 X |

FOREIGN PATENT DOCUMENTS 148427  9/1952  Australia ............................... 220/4.02

*Primary Examiner*—Steven M. Pollard

[57] ABSTRACT

A uniform building entrance protector housing construction includes a base layer in the shape of a generally rectangular box with a back wall and a side wall extending from the perimeter of the back wall. A number of equipment mounts inside the base layer are arranged to support wire cable equipment when mounted in the base layer, and first base layer hinge parts are provided on a section of the side wall. The housing construction also has a top layer including a frame portion with a frame wall having a top opening and a bottom opening. A first frame wall section has first frame portion hinge parts located on the section to engage the first base layer hinge parts for swinging movement about a first hinge axis. A second frame wall section has second frame portion hinge parts. The top layer also has a cover member with cover hinge parts located to engage the second frame portion hinge parts for swinging movement about a second hinge axis. The first frame portion hinge parts and the cover hinge parts are also constructed so that the first frame portion hinge parts are separable from the first base layer hinge parts, and the cover hinge parts are operatively engageable with mating hinge parts on the base layer in the absence of the frame portion.

14 Claims, 8 Drawing Sheets

UNIFORM BUILDING ENTRANCE PROTECTOR HOUSING CONSTRUCTION WITH EXPANDABLE SPLICE CHAMBER

BACKGROUND OF THE INVENTION

1. Field of the Invention

The present invention relates to constructions for telephone wire entrance terminal housings, and particularly to a housing construction in which a splice chamber or other housing compartments can be expanded while maintaining uniform outer dimensions for the housing.

2. Discussion of the Known Art

Building entrance protector (BEP) terminals serve to prevent sensitive telephone or other electrical equipment inside a building, from damage caused by high voltage surges carried over communications wires or cables (hereafter "wire cables") that enter the building. A terminal housing is usually fastened on a wall of the building, at the point of entry of the wire cables, and the wire cables enter a splice chamber through an opening in the housing wall. In the splice chamber, the wire cables are terminated in a first connector. A second connector mates with the first one and wires leading from the second connector are connected to terminals on a protector module panel, in a second region of the housing. The panel has an array of protector module sockets on its surface, for accepting plug-in surge protector modules each of which has typically five pins. Other wires connect the module panel terminals to a customer terminal interface block in a third region of the housing. Customer wire cables enter the terminal housing through another opening to connect with the customer terminal interface block.

U.S. Pat. No. 5,363,440 (Nov. 8, 1994) shows a multi-layered network interface unit, having a lower layer which includes a splice chamber, a protector panel and an interface block, and an upper layer removably mounted to the lower layer. The upper layer supports an array of customer bridges each for coupling to a different customer line. The upper layer has a hinged cover that can be opened by a customer to gain access to a particular bridge, for testing the integrity of customer-side wire lines.

Presently, a wide range of different size splice chambers are needed in BEP terminal housings, to contain a wide variety of splicing connectors that accommodate various wire cable dimensions and capacities. As the dimensions of the splice chamber increase in size, overall dimensions including the width of the BEP terminal housing increase accordingly. A problem arises whenever BEP terminals are stacked vertically one above the other on a building wall, however. There, it is important to align corresponding wire cable openings in the individual terminal housings with one another respectively, so that network and customer wire cables along both sides of the stacked terminals can enter and exit the terminal housings in a uniform manner. As mentioned, BEP terminals with high wire capacity will require more wall space. As the wire capacity grows, so may the width of the BEP terminal housing. Thus, whenever BEP terminals with different wire capacities are stacked with network-side openings in their housings aligned vertically with one another, the customer-side openings in the housings are usually not properly aligned. Such misalignment makes it difficult, among other things, to trace individual wires running alongside the housings.

SUMMARY OF THE INVENTION

According to the invention, a uniform building entrance protector housing construction, comprises a base layer in the form of a generally rectangular box with a back wall, and a side wall extending from the perimeter of the back wall.

The base layer has first base layer hinge parts on a section of the side wall, and a number of equipment mounts inside the base layer are located to support wire cable equipment when mounted in the base layer. A top layer includes a frame portion comprised of a frame wall having a top opening and a bottom opening. The frame wall has a first frame wall section and first frame portion hinge parts on the wall section located to engage the first base layer hinge parts for swinging movement about a first hinge axis. Second frame portion hinge parts are provided on a second frame wall section.

A cover member of the top layer has cover hinge parts located to engage the second frame portion hinge parts for swinging movement about a second hinge axis between a covered position at which the cover member closes the top opening of the frame wall, and an uncovered position at which an inner region of the frame portion is accessible.

When hinged to one another, the frame portion and the cover member align with the base layer and shield the interior of the base layer when the cover member is at the covered position, and the frame portion is swung about the first hinge axis to a closed position relative to the base layer. The interior of the base layer is accessible when the frame portion is swung about the first hinge axis to an open position relative to the base layer. The first frame portion hinge parts and the cover hinge parts are constructed and arranged so that the first frame portion hinge parts are separable from the first base layer hinge parts, and the cover hinge parts are operatively engageable with mating hinge parts on the base layer to permit swinging movement of the cover member on the base layer in the absence of the frame portion.

For a better understanding of the present invention, reference is made to the following description taken in conjunction with the accompanying drawing, and the scope of the invention will be pointed out in the appended claims.

DETAILED DESCRIPTION OF THE INVENTION

Figure 1:
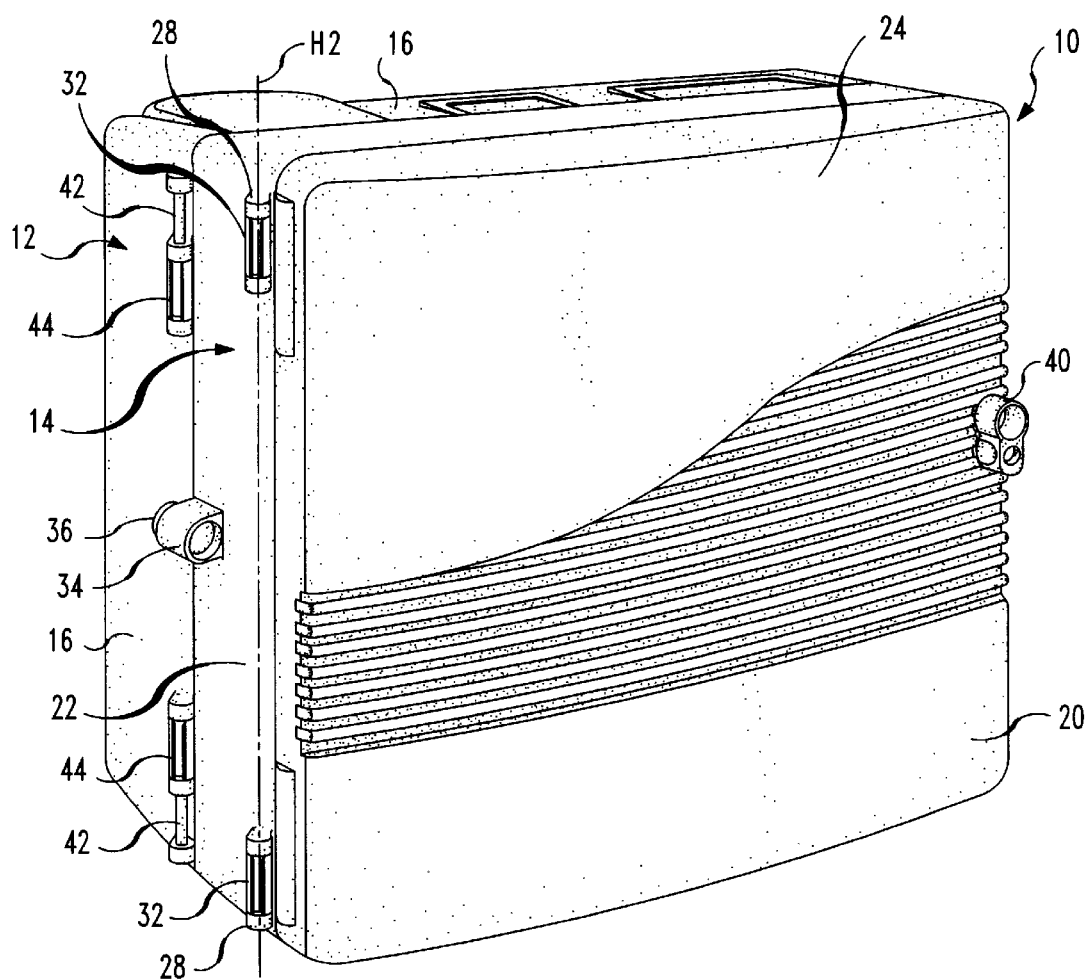
FIG. 1 is a perspective view of a building entrance protector housing according to the invention, shown in a fully closed position looking from the left.
Figure 2:
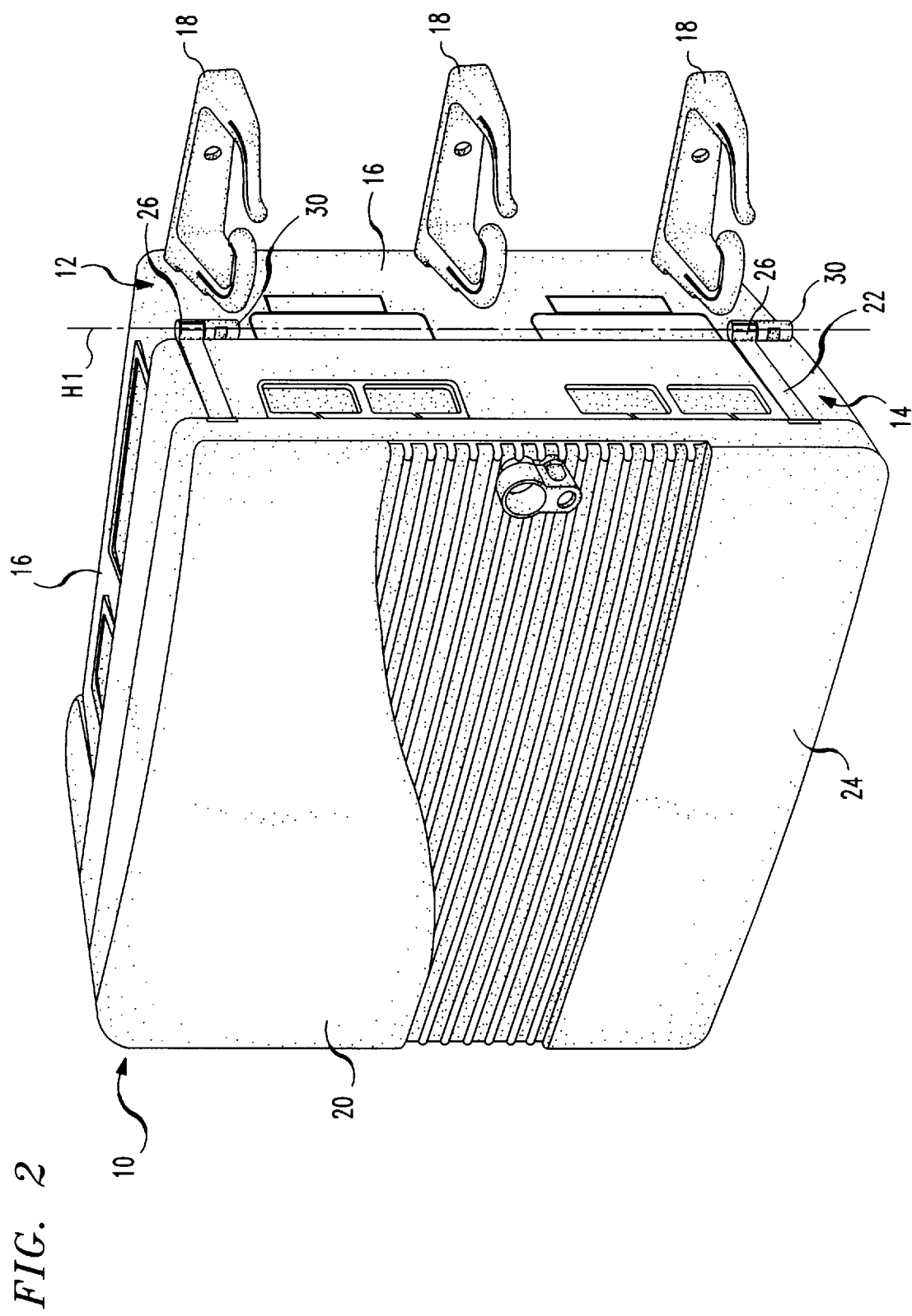
FIG. 2 is a perspective view of the terminal housing in FIG. 1 as seen from the right.

FIG. 1 is a perspective view of a building entrance protector (BEP) terminal housing 10, according to the invention, shown in a fully closed position looking from the left of the housing 10. FIG. 2 is a perspective view of the housing 10 in FIG. 1, as seen from the right. The housing comprises a base section or layer 12 at the back of the housing 10 as viewed in FIGS. 1 and 2, and a top layer 14. The base layer 12 is in the form of a generally rectangular box having a back wall 15 at the rear of the housing (see FIG. 6) and a side wall 16 that extends from the perimeter of the back wall toward the front of the housing 10. A set of flexible cable clamps 18 mount through corresponding openings in the side wall 16, at the right side of the housing 10 for harnessing customer-side wire cables (not shown). See FIG. 8.

The top layer 14 includes a cover member 20, shown at a covered position in FIGS. 1 and 2 with respect to the top layer 14. In the embodiment illustrated in FIGS. 1 and 2, the top layer 14 also includes a frame wall 22 a front opening of which may be shielded by the cover member 20, and a back opening of which faces the interior of the base layer 12. Thus, the cover member 20 and the frame wall 22 together form a cover wall 24 and a side wall projecting from the periphery of the cover wall 24, to align the top layer 14 with the base layer 12 at the closed position in FIGS. 1 and 2, where the base layer 12 is protectively shielded by the top layer 14. The base layer 12, top layer 14 and cover member 20, are preferably made of an electrically non-conductive material that can be molded from, for example, polycarbonate.

As seen in FIG. 2, a pair of frame hinge parts 26 protrude from the right side of the frame wall 22, near a back edge of the frame wall. The frame hinge parts 26 coincide with a first hinge axis H1 near the boundary between the top layer 14 and the base layer 12. A pair of second frame hinge parts 28 protrude from the left side of the frame wall 22 as seen in FIG. 1, near a front edge of the frame wall. The hinge parts 28 coincide with a second hinge axis H2 which is near the boundary between the frame wall 22 and the cover member 20. In the illustrated embodiment, the second hinge axis H2 is parallel to the hinge axis H1 (FIG. 2), and is located on the side of the frame wall 22 opposite the side of axis H1.

The base layer 12 has two hinge parts 30 that protrude from the right side of the base layer side wall 16 as viewed in FIG. 2. The hinge parts 30 are constructed and located to cooperate with the first frame hinge parts 26 on the top layer frame wall 22, thus enabling the frame wall 22 to swing with respect to the base layer 12 about the first hinge axis H1. Preferably, the first frame hinge parts 26 and the base layer hinge parts 30 are constructed to be separable from one another along the direction of the axis H1, for example, by sliding the frame wall 22 upward relative to the base layer 12 until the mating hinge parts 28, 30 disengage from one another.

The cover member 20 has two hinge parts 32 that project from the left side of the cover member as viewed in FIG. 1. The hinge parts 32 are constructed and located to cooperate with the second frame hinge parts 28 on the frame wall 22, to enable the cover member 20 to swing with respect to the frame wall 22 about the hinge axis H2. Preferably, the mating hinge parts 28, 32 are constructed so that they can disengage from one another by, for example, swinging the cover member 20 beyond a normal open position.

A first lug 34 protrudes from the frame wall 22 on the left side of the wall 22 as viewed in FIG. 1, near the boundary between the frame wall 22 and the side wall 16 of the base layer 12. A second lug 36 projects from the base layer side wall 16 to align with the first lug 34 when the frame wall 22 is closed over the base layer 12. The first lug 34 has a recessed screw through hole for passage of a security fastener, a lower portion of which engages the second lug 36 to lock the frame wall 22 snugly against the side wall 16. Preferably, the first and the second lugs 34, 36 are separated from each other with a special tool used only by authorized personnel.

Cover member 20 has a cover lock 40 for keeping the cover member closed snugly against the top layer frame wall 22. In applications where the cover member 20 is to be opened by a customer to access customer bridges or other devices associated with the customer-side wiring, the cover lock 40 may be unlocked using a common tool such as a screwdriver. When there are no customer serviceable components beneath the cover member 20, the cover lock 40 may be restricted for operation only by authorized personnel, as are the locking lugs 34, 36.

A pair of base layer hinge parts 42 protrude from the left of the base side wall 16 as viewed in FIG. 1, near the boundary between the side wall 16 and the top layer 14. In the preferred embodiment, the hinge parts 42 each comprise a hinge shaft that is joined to the side wall 16 by a pair of outer lugs and a center lug, to define two equal shaft sections on each of the hinge parts 42. One of the hinge shaft sections engages an open ferrule 44 that extends from a side edge of a splice chamber cover (see FIG. 3). The other shaft section of each of the hinge parts 42 receives a corresponding ferrule or hinge part 32 on the cover member 20 for applications where the top layer side wall 16 is not used, wherein the cover member 20 can be hinged directly to the base layer 12 and secured to the base layer via the cover lock 40.

Figure 3:
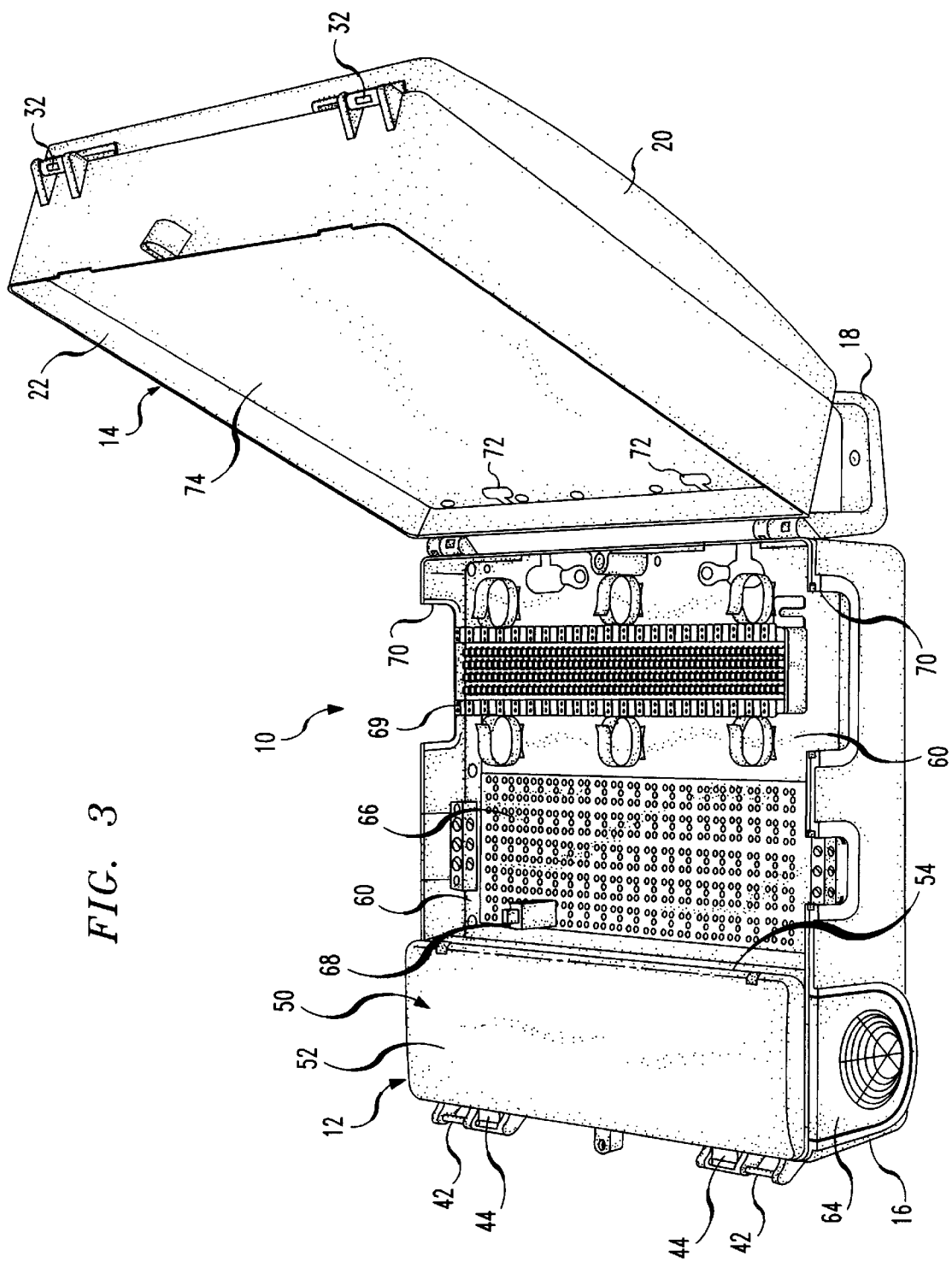
FIG. 3 is a perspective view of the present terminal housing, with a top layer of the housing in an open position to expose a base layer of the housing with a splice chamber.

FIG. 3 is a perspective view of the present terminal housing 10, with the top layer 14 in an open position, exposing the interior of the base layer 12. In the arrangement of FIG. 3, the base layer 12 has a splice chamber 50 defined by the base layer side wall 16 at the left of the base layer 12 in FIG. 3, a splice chamber cover 52, and a partition wall 54 that forms a right side wall of the splice chamber 50 in FIG. 3. An interior region 56 of the splice chamber 50, and partition wall support flanges 58 are viewable in FIG. 6, which shows the base layer 12 without parts mounted in its interior. As explained below, the splice chamber 50 in FIG. 3 may be fully expanded to occupy the whole interior of the base layer 12 shown in FIG. 6.

An equipment panel 60 in FIG. 3, extends from the left at the splice chamber partition wall 54, to the right up to the base layer side wall 16. The equipment panel 60 is mounted on a set of bosses 62 shown in FIG. 6. The bosses 62 serve as mounting means inside the base layer 12 and are joined to the base layer side wall 16. Bosses 62 extend from and are also joined with the back wall 15 of the base layer. Preferably, all the bosses 62 are of uniform height so that a wide single panel such as the equipment panel 60 in FIG. 3, can be supported in one plane on the bosses 62.

Figure 6:
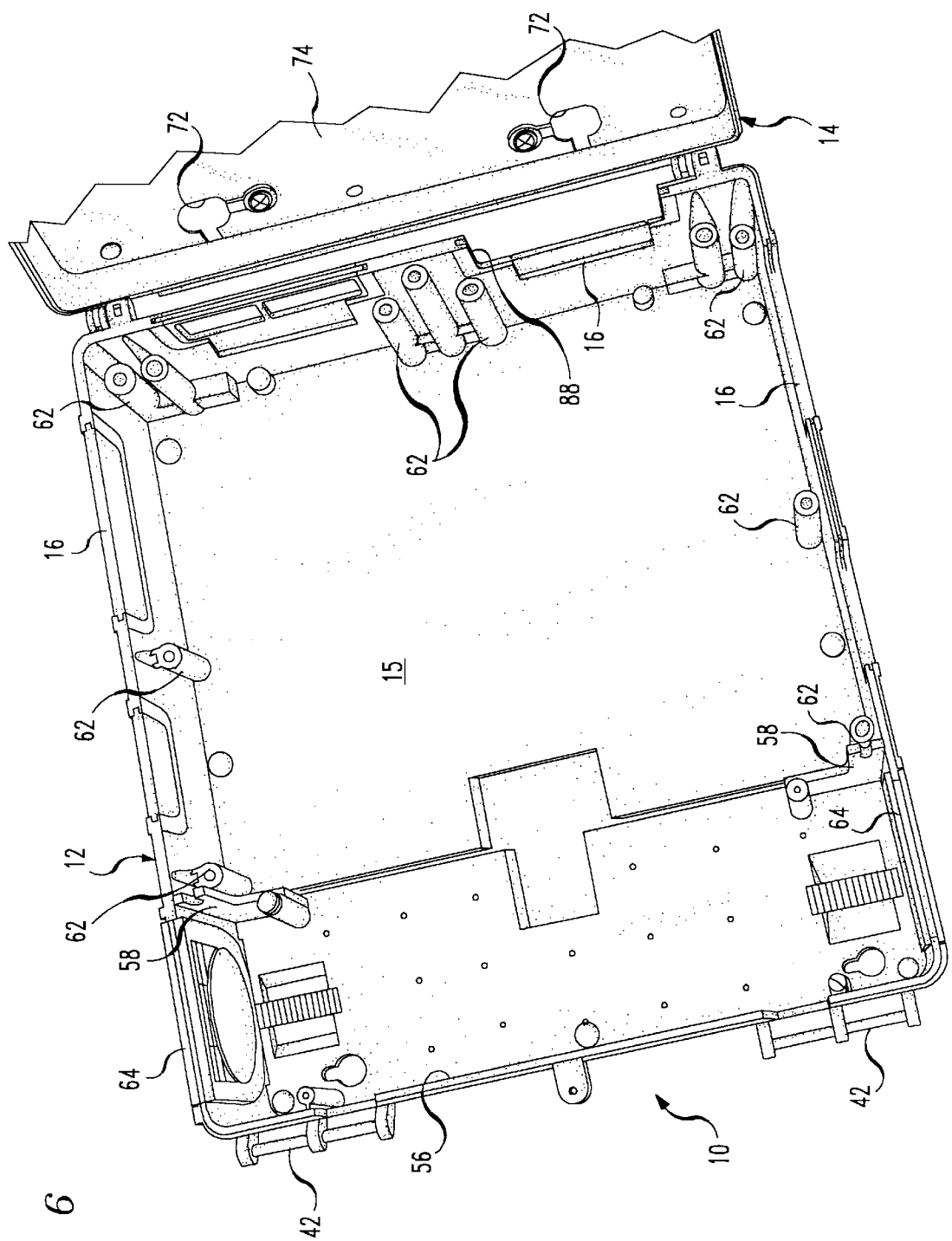
FIG. 6 is a perspective view of the housing base layer wherein the whole interior of the base layer forms an expanded splice chamber.

The base layer 12 has a pair of detachable grommets 64 in its side wall 16, at the top and bottom ends of the splice chamber region 56 as seen in FIG. 6. Grommets 64 may be withdrawn entirely from the side wall 16 to permit large wire cables to enter or pass directly through the splice chamber region 56 from outside the terminal housing 10. Circular portions of the grommets 64 may also be removed selectively while leaving the main bodies of the grommets in place, to accommodate wire cables of various smaller diameters.

The equipment panel 60 in FIG. 3 has a relatively large rectangular cut-out at the left, and a protector module panel 66 is fastened beneath the panel 60 to extend across the cut-out. As mentioned earlier, the module panel 66 has an array of 5-pin sockets for receiving individual protector modules 68 one of which is shown in FIG. 3. Wire cables entering the splice chamber 50 are connected to corresponding terminals below the module panel 66 through a pair of splice connectors in the chamber 50, with connecting wires extending beneath the panel 60.

The right portion of the equipment panel 60 in FIG. 3, supports a customer interface terminal block 69. Wires connect between terminals beneath the module panel 66 and the interface block 69 beneath the equipment panel 60. Wire cables may then be routed to and from the interface block 69 through a pair of side wall openings 70 above and below the block 69 in FIG. 3, or, alternatively, to an array of customer bridge terminals in the top layer 14 by routing the wires through a pair of openings 72 in a top layer back panel 74.

In applications where wire cables leading to and from the customer terminal interface block 69 run through the side wall openings 70, to enter and exit corresponding openings in other like terminal housings aligned vertically on a building wall, and no customer bridge terminals are housed in the present housing 10, the top layer frame wall 22 may be removed from the base layer 12 at the hinge parts 30 of the base layer. Then the cover member 20 alone may be joined to the base layer 12 by joining its hinge parts 32 to the base layer hinge parts 42.

Figure 4:
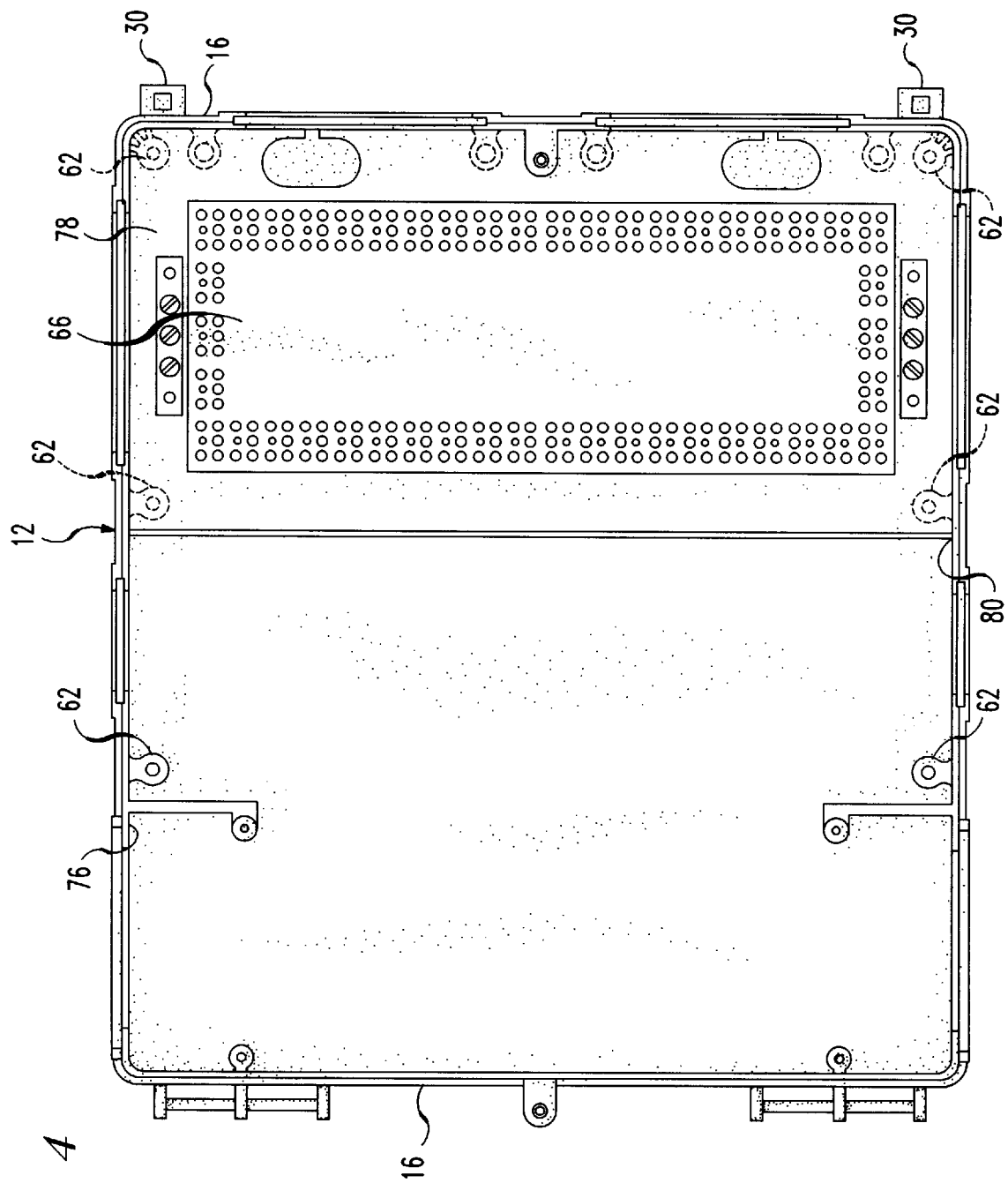
FIG. 4 is a plan view of another configuration for the housing base layer, with an expanded splice chamber region.

FIG. 4 is a plan view of the housing base layer 12 having an expanded splice chamber region 76. An equipment panel 78 different from the panel 60 in FIG. 3, is supported on less than all the bosses 62 formed in the base layer. In FIG. 4, the equipment panel 78 extends from the right of the base layer 12 to a point 80 less than half-way the distance to the left of the base layer in FIG. 4. Thus, more than one half the interior volume of the base layer is available for the expanded splice chamber region 76.

The equipment panel 78 has a large rectangular cut-out beneath which the protector module panel 66 (FIG.3) is fastened, for mounting a number of the protector modules 68. The customer terminal interface block 69 and other equipment may then be contained in the housing top layer 14, the frame wall 22 of which is joined to the base layer hinge parts 30 on the base layer side wall 16.

Figure 5:
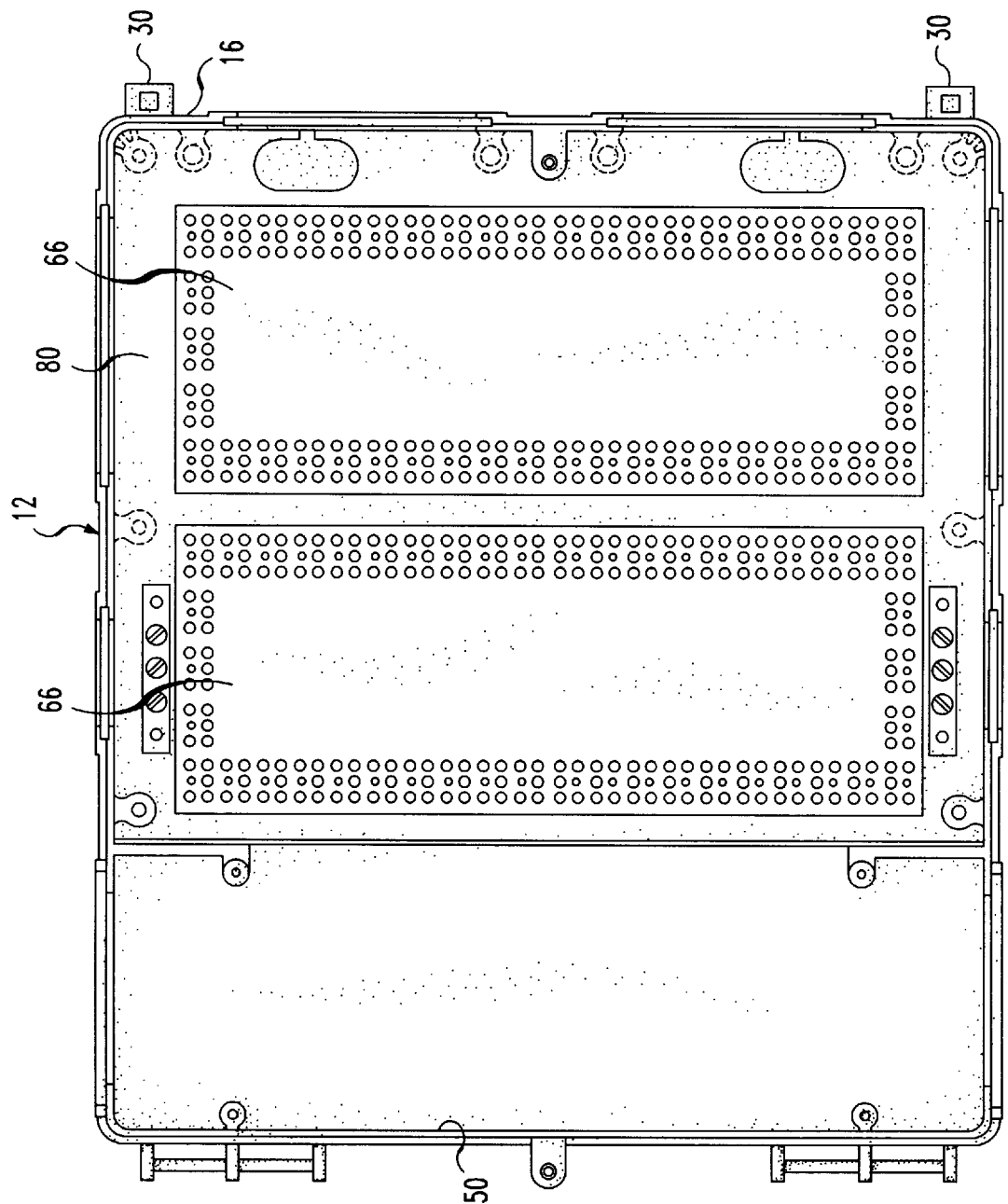
FIG. 5 is a plan view of another configuration for the housing base layer, with the same splice chamber region as in FIG. 3.

FIG. 5 is a plan view of the housing base layer 12 having the splice chamber 50 in FIG. 3, but also including an equipment panel 80 different from the panels 60, 78 in FIGS. 3 and 4. The equipment panel 80 provides an "extra large" protector module field in the base layer 12, by supporting two module panels 66 beneath two corresponding panel cut-outs. As in the arrangement of FIG. 4, a customer terminal interface block and a customer bridge terminal array may then be contained in the top layer which is joined on the hinge parts 30 on the base layer side wall 16.

Figure 7:
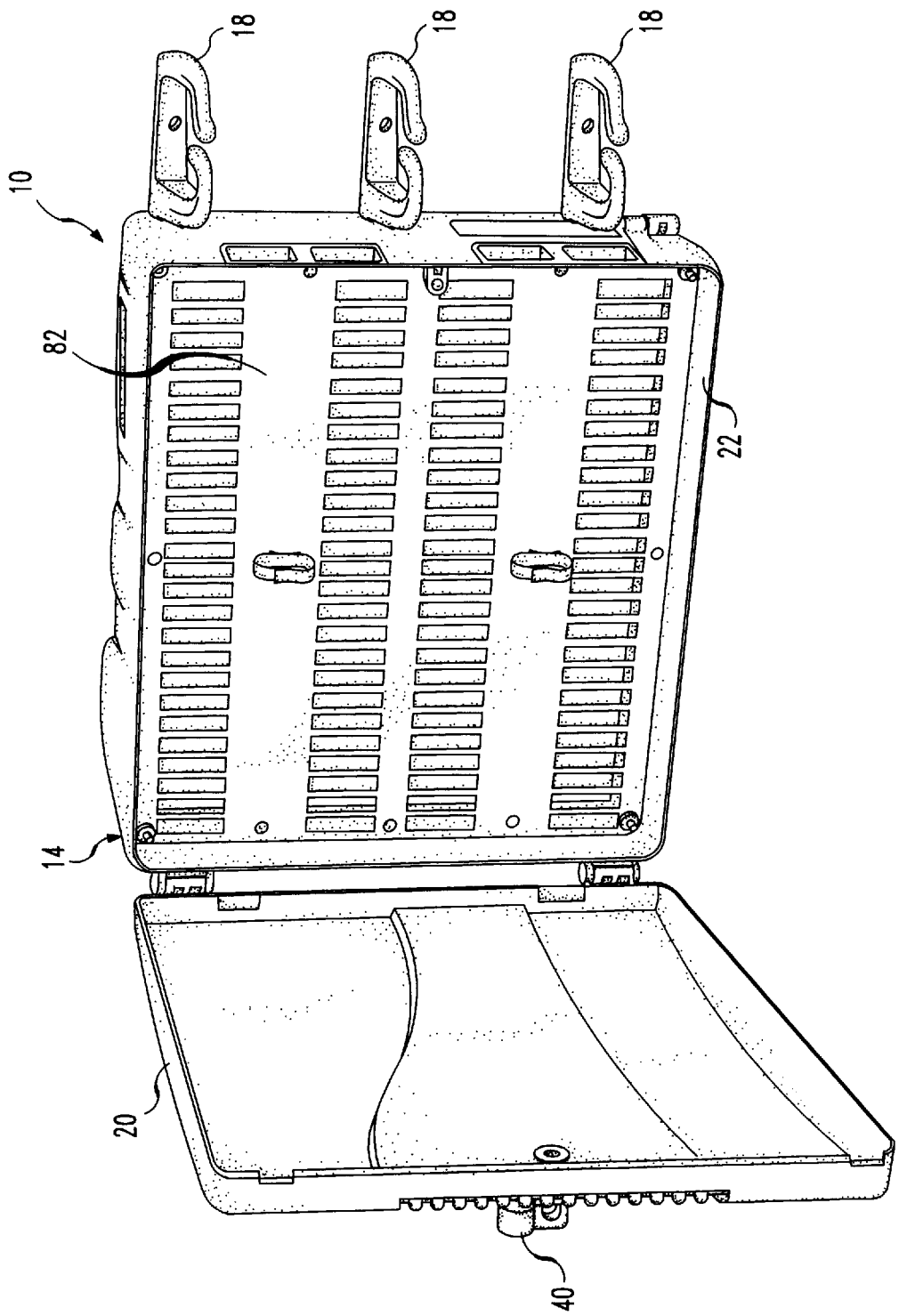
FIG. 7 is a perspective view of the housing as in FIG. 2, but with a top layer cover member swung open to expose an inner region of the top layer.

FIG. 7 is a view of the present terminal housing 10 as in FIG. 2, with the top layer cover member 20 swung to uncover a front panel 82 mounted in the frame wall 22 of the top layer 14. The front panel 82 has an array of small rectangular cut-outs, in which conventional customer bridge terminals can be mounted. For applications such as those in FIGS. 4 and 6, wherein the housing splice chamber is expanded and protector modules or other equipment not intended for customer access is to be mounted in the top layer 14, such equipment should be shielded from customer access when the cover member 20 is opened. Alternatively, the cover lock 40 on the cover member can be a security lock mechanism for operation only by authorized service personnel, and customer bridge networks or other customer-accessible equipment may be located elsewhere near the housing 10.

Figure 8:
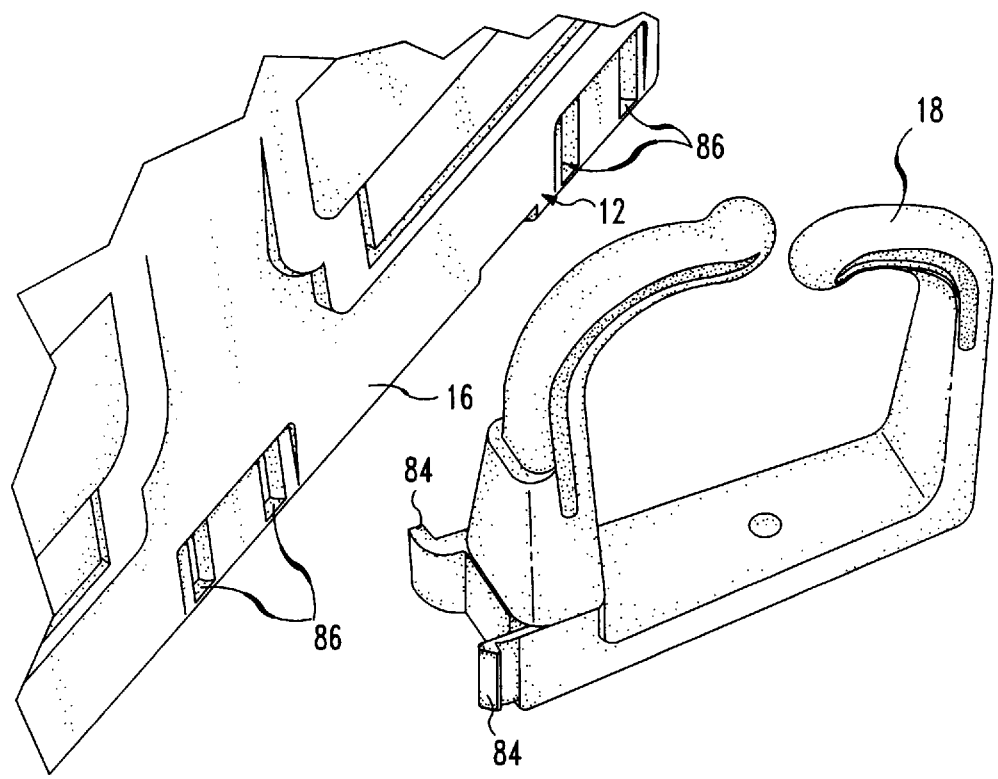
FIG. 8 is a perspective view of a detachable cable clamp member.

FIG. 8 is a view of the cable clamp 18, shown detached from the side wall 16 of the base layer 12. If the overall width of the housing 10 is less than that of other BEP terminal housings with which the housing 10 is to be aligned on a building wall, the distance between the incoming and the customer wire cable runs may be greater than the distance between the side wall openings at 64 and 70 (FIG. 3). In such cases, the housing 10 is mounted so that its splice chamber openings at the left are aligned with existing incoming wire cables, and the cable clamps 18 are inserted at the right of the housing 10 by snapping a pair of ears 84 at the side of each clamp into corresponding slots 86 formed in the base layer side wall 16. Customer-side wire cables may then pass through the aligned clamps 18 and selected openings such as the openings 88 (FIG. 6) in the side wall. Preferably, all side wall openings are provided with grommets or covers that can be inserted in or removed from the openings as necessary, depending on the particular application in which the BEP terminal housing 10 is placed.

While the foregoing description represents a preferred embodiment of the invention, it will be obvious to those skilled in the art that various changes and modifications may be made, without departing from the spirit and scope of the invention as pointed out by the following claims.

What I claim is:

1. A uniform building entrance protector housing construction, comprising;

a base layer in the form of a generally rectangular box having a back wall and a side wall extending from the perimeter of said back wall, the base layer having first base layer hinge parts on a first section of said side wall;

a number of equipment mounts inside said base layer which mounts are constructed to support wire cable equipment when mounted in the base layer;

a top layer including
 a frame portion comprising a frame wall having a top opening and a bottom opening, wherein the frame wall has a first frame wall section and first frame portion hinge parts on the first frame wall section constructed to engage the first base layer hinge parts for swinging movement about a first hinge axis, and a second frame wall section with second frame portion hinge parts,
 a cover member, and
  cover hinge parts on the cover member located and constructed to engage the second frame portion hinge parts for swinging movement about a second hinge axis between a covered position at which the cover member closes the top opening of the frame wall, and an uncovered position at which an inner region of the frame portion is accessible;
  wherein, when hinged to one another, the frame portion and the cover member align with the base layer and shield the interior of the base layer when the cover member is at the covered position and the frame portion is swung about the first hinge axis to a closed position relative to the base layer, and the interior of the base layer is accessible when the frame portion is swung about the first hinge axis to an open position relative to the base layer; and wherein the first frame portion hinge parts and the cover hinge parts are constructed so that the first frame portion hinge parts are separable from the first base layer hinge parts, and the cover hinge parts are operatively engageable with mating hinge parts on the base layer to permit swinging movement of the cover member on the base layer in the absence of the frame portion.

2. A uniform housing construction according to claim 1, wherein the side wall of said base layer has a number of wire cable openings.

3. A uniform housing construction according to claim 2, including detachable covers for protectively covering the wire cable openings in the side wall of the base layer.

4. A uniform housing construction according to claim 2, wherein the wire cable openings in the side wall of the base layer are formed so that when a number of like housing constructions are aligned vertically with one another on a supporting surface, wire cable openings in a base layer of one housing construction are aligned vertically with wire cable openings in a base layer of an adjacent housing construction.

5. A uniform housing construction according to claim 1, wherein said base layer includes second base layer hinge parts on a second section of said side wall, and the second base layer hinge parts are located and constructed to engage the cover hinge parts on the cover member, so that said cover member can be hinged on the second base layer hinge parts of said base layer for relative movement between a closed position at which the interior of the base layer is shielded by the cover member in the absence of said frame portion, and an open position at which the interior of the base layer is accessible.

6. A uniform housing construction according to claim 5, including a splice chamber cover having chamber cover hinge parts located and constructed to engage mating hinge parts on the base layer for swinging movement relative to the base layer for covering a splice chamber when defined in the base layer.

7. A uniform housing construction according to claim 1, wherein said base layer has supports arranged to locate a splice chamber partition wall.

8. A uniform housing construction according to claim 1, including an equipment panel mounted on said equipment mounts, said equipment panel having a surge protector module field and a terminal interface block field.

9. A uniform housing construction according to claim 1, including a first equipment panel mounted on said equipment mounts, said first equipment panel having a surge protector module field, and a second equipment panel mounted in the frame portion of said top layer.

10. A uniform housing construction according to claim 1, including an equipment panel mounted in the frame portion of said top layer, and substantially the whole interior of said base layer forms a splice chamber.

11. A uniform housing construction according to claim 1, wherein the equipment mounts inside said base layer are located and formed to support a desired one of a number of different size wire cable equipment panels, and wherein at least a part of the interior of said base layer forms a wire cable splice chamber if a selected panel is supported on certain ones of the equipment mounts, and substantially the whole interior of said base layer forms a wire cable splice chamber in the absence of an equipment panel mounted in said base layer.

12. A uniform housing construction according to claim 11, wherein said equipment mounts comprise a number of bosses adjacent the side wall of said base layer.

13. A uniform housing construction according to claim 12, wherein said bosses have a uniform height above the back wall of the base layer to support a desired one of a number of different size equipment panels at a number of points in a common plane.

14. A uniform housing construction according to claim 1, including at least one cable clamp constructed and arranged to be attachable to the outside of the side wall of the base layer, so that wire cables associated with an adjacent protector housing that is wider than said base layer will pass through the cable clamp when another part of the base layer is aligned with the adjacent housing.

* * * * *